(12) United States Patent  
Chi (10) Patent No.: US 12,142,304 B2
(45) Date of Patent: Nov. 12, 2024

(54) HARD DISK STATUS TESTING APPARATUS AND METHOD

(71) Applicant: INSPUR SUZHOU INTELLIGENT TECHNOLOGY CO., LTD., Jiangsu (CN)

(72) Inventor: Jinbo Chi, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 130 days.

(21) Appl. No.: 18/009,808

(22) PCT Filed: Feb. 23, 2021

(86) PCT No.: PCT/CN2021/077385
§ 371 (c)(1),
(2) Date: Dec. 12, 2022

(87) PCT Pub. No.: WO2022/007415
PCT Pub. Date: Jan. 13, 2022

(65) Prior Publication Data
US 2023/0221387 A1 Jul. 13, 2023

(30) Foreign Application Priority Data

Jul. 9, 2020 (CN) .......................... 202010656621.0

(51) Int. Cl.
*G11B 27/36* (2006.01)
*G06F 11/22* (2006.01)

(52) U.S. Cl.
CPC .......... *G11B 27/36* (2013.01); *G06F 11/2273* (2013.01); *G11B 2220/2516* (2013.01)

(58) Field of Classification Search
None
See application file for complete search history.

(56) References Cited

U.S. PATENT DOCUMENTS 6,169,413 B1 * 1/2001 Paek ...................... G06F 11/24
714/E11.154
9,099,101 B1 * 8/2015 Kudo ..................... G11B 5/012
(Continued)

FOREIGN PATENT DOCUMENTS

CN 101231610 A 7/2008
CN 108021493 A 5/2018
(Continued)

OTHER PUBLICATIONS

Machine translation of Wu, TW-I659302, May 11, 2019.*
(Continued)

*Primary Examiner* — Peter Vincent Agustin
(74) *Attorney, Agent, or Firm* — Cooper Legal Group, LLC (57) ABSTRACT

A hard disk status testing apparatus, including: a voltage reading module, a controller, an analogue switch, and multiple hard disk slot units. Each hard disk slot unit includes: a hard disk status testing module and a hard disk status indication module. The hard disk status testing modules and the hard disk status indication modules among different hard disk slot units are time-multiplexed, achieving independent control of the hard disk status testing modules of different hard disk slot units and independent control of the hard disk status indication modules of different hard disk slot units. A hard disk status testing method that effectively solves the problem of an increase in the number of pins needed for hard disk status testing and status indication, thus effectively decreasing hardware costs and increasing the utilization rate of pin resources.

19 Claims, 5 Drawing Sheets

(56) References Cited

U.S. PATENT DOCUMENTS

| | | | | |
|---|---|---|---|---|
| 2006/0107124 A1* | 5/2006 | Yagi | ............ | G11B 19/047 |
| | | | | 714/50 |
| 2006/0250724 A1* | 11/2006 | Hayashi | ............ | G11B 19/2009 |
| 2012/0166885 A1* | 6/2012 | Zhan | ............ | G11B 20/1816 |
| | | | | 714/E11.062 |
| 2017/0046219 A1* | 2/2017 | Krishnappa | ............ | H03M 13/11 |
| 2023/0221387 A1* | 7/2023 | Chi | ............ | G06F 11/2221 |
| | | | | 714/42 |

FOREIGN PATENT DOCUMENTS

| | | | |
|---|---|---|---|
| CN | 109347483 A | 2/2019 | |
| CN | 110399276 A | 11/2019 | |
| CN | 111930576 A | 11/2020 | |
| JP | 2001356881 A | 12/2001 | |
| JP | 2008027240 A | 2/2008 | |
| TW | 201009569 B | 3/2010 | |
| TW | I659302 B | 5/2019 | |

OTHER PUBLICATIONS

Corresponding International Patent Application No. PCT/CN2021/077385, International Search Report, Date Mailed May 19, 2021.
Corresponding International Patent Application No. PCT/CN2021/077385, Written Opinion, Date Mailed May 19, 2021.
Corresponding Chinese Patent Application No. 202010656621.0, First Office Action dated Sep. 30, 2022.

* cited by examiner

HARD DISK STATUS TESTING APPARATUS AND METHOD

This application claims priority to Chinese Patent Application No. 202010656621.0, filed on Jul. 9, 2020 in China National Intellectual Property Administration and entitled "HARD DISK STATUS TESTING APPARATUS AND METHOD", which is hereby incorporated by reference in its entirety.

FIELD

The present disclosure relates to the field of hard disk testing, in particular to a hard disk status testing apparatus and method.

BACKGROUND

Big data, cloud computing and artificial intelligence all take data as core resources, and acquired original data obtained and processed valid data need to be properly stored and managed. Objective application needs constantly drive the sustainable development of a storage technology. The storage capacity of a traditional mechanical Hard Disk Drive (HDD) is constantly upgraded and iterated. A Solid Status Disk (SSD) is growing rapidly, and its applications are more and more widespread. From Serial Advanced Technology Attachment (SATA)/Serial Attached SCSI (SAS) to Peripheral Component Interconnect express (PCIe), the bandwidth of a transmission bus is constantly increasing. Despite the continuous development of hard disks and storage technologies, basic methods of hard disk management on a backplane are the same, all having functions of testing hard disk presence, statuses and the like and functions of controlling hard disk running status indicator lamps. Hardware resources required for managing these hard disks are relatively fixed and can be evaluated. With the increase of the number of hard disks, the hardware resources required for the management basically grow linearly.

In the prior art, whether an SAS/SATA hard disk is present is determined by testing a level (which is valid at a low level) of pin P5 of a Small Form Factor (SFF-8680) interface. The SFF-8639 interface distinguishes a Non-Volatile Memory Express (NVME) hard disk from the SAS/SATA hard disk by means of different levels of PRESENT_N and IFDET_N. When both PRESENT_N and IFDET_N are low, the SAS/SATA hard disk is accessed. When PRESENT_N is high (after a pull-up resistor is externally connected), and IFDET_N is low, the NVME hard disk is accessed.

A Complex Programmable Logic Device (CPLD) determines a running status of a hard disk by testing ACTIVITY Pin of the hard disk. When the hard disk is absent, ACTIVITY Pin remains an open circuit status (a high level is achieved after a pull-up resistor is externally connected). When the hard disk is present, but has not been read and written, ACTIVITY Pin remains at a low level. When the hard disk is read and written, ACTIVITY Pin cyclically outputs low levels and high resistance statuses. Different manufactures may have different low-level maintenance time for hard disks, but the total cycle is ½ s.

In order to facilitate the on-site maintenance and management of hard disks, for each hard disk, three Light Emitting Diodes (LEDs) of different colors are designed on a backplane to indicate Location, Activity and Fault of the hard disk. The light is guided to a cabinet through a light guide for hard disk status indication. The LEDs are controlled through CPLD pins.

However, PRESENT_N, IFDET_N, and ACTIVITY signals of each hard disk slot need to be tested using independent pins. If there are N hard disks, 3N pin resources will be occupied. The Location indicator lamp, the Active indicator lamp and the Fault indicator lamp on the backplane for each hard disk are controlled using independent pins. If there are N hard disks, 3N pin resources will be occupied.

With the increase of the number N of hard disks, the number of testing signal pins and the number of light-on signal pins increase at a rate of 3N, which will be implemented using a CPLD or a control chip with more pins. The hardware cost is increased, and a waste of pin resources is caused.

SUMMARY

In order to solve the problems in the prior art, the present disclosure innovatively provides a hard disk status testing apparatus and method, which effectively solves the problem of an increase in the number of pins needed for hard disk status testing and status indication, thus effectively decreasing hardware costs and increasing the utilization rate of pin resources.

A first aspect of the present disclosure provides a hard disk status testing apparatus, including a voltage reading module, a controller, an analogue switch, and multiple hard disk slot units. Each hard disk slot unit includes: a hard disk status testing module and a hard disk status indication module; a testing output end of each hard disk status testing module is connected to an input end of the analogue switch; an output end of the analogue switch is connected to an input end of the voltage reading module; a control input end of each hard disk status indication module is connected to a control output end of the controller, and the hard disk status testing modules and the hard disk status indication modules among different hard disk slot units are time-multiplexed, achieving independent control of the hard disk status testing modules among different hard disk slot units and independent control of the hard disk status indication modules among different hard disk slot units.

In some embodiments, the hard disk status testing module includes: a first presence testing terminal, a second presence testing terminal, an activity status testing terminal, a pull-up resistor R1, a first testing resistor R2, a second testing resistor R3, and a third testing resistor R4; the first presence testing terminal is connected to one end of the first testing resistor R2; one path of other end of the first testing resistor R2 is connected to a power supply VCC through the pull-up resistor R1, and other path is connected to a first input end of the analogue switch; the second presence testing terminal is connected to one end of the second testing resistor R3; one path of other end of the second testing resistor R3 is connected to the power supply VCC through the pull-up resistor R1, and other path is connected to the first input end of the analogue switch; the activity status testing terminal is connected to one end of the third testing resistor R4; one path of other end of the third testing resistor R4 is connected to the power supply VCC through the pull-up resistor R1; and other path is connected to the first input end of the analogue switch.

Further, the resistance values of the pull-up resistor R1, the first testing resistor R2, the second testing resistor R3 and the third testing resistor R4 are different from each other.

In some embodiments, the hard disk status testing modules among different hard disk slot units are selected by the analogue switch to achieve time multiplexing.

Further, the voltage reading module is a control chip with an analog-digital conversion (ADC) function.

In some embodiments, the hard disk status indication module includes: a first status indicator lamp, a second status indicator lamp, a third status indicator lamp, a metal oxide semiconductor (MOS) transistor Q1, and a current-limiting resistor R8; one path of a positive pole of the first status indicator lamp is connected to the power supply VCC through a pull-up resistor R5, and other path is connected to the control output end of the controller; a negative pole of the first status indicator lamp is connected to a drain of the MOS transistor Q1; a gate of the MOS transistor Q1 is connected to a first enable control output end of the controller through the current-limiting resistor R8; a source of the MOS transistor Q1 is grounded; one path of a positive pole of the second status indicator lamp is connected to the power supply VCC through a pull-up resistor R6, and other path is connected to the control output end of the controller; a negative pole of the second status indicator lamp is connected to the drain of the MOS transistor Q1; the gate of the MOS transistor Q1 is connected to the first enable control output end of the controller through the current-limiting resistor R8; the source of the MOS transistor Q1 is grounded; one path of a positive pole of the third status indicator lamp is connected to the power supply VCC through a pull-up resistor R7, and other path is connected to the control output end of the controller; a negative pole of the third status indicator lamp is connected to the drain of the MOS transistor Q1; the gate of the MOS transistor Q1 is connected to the first enable control output end of the controller through the current-limiting resistor R8; and the source of the MOS transistor Q1 is grounded.

Further, the gate of the MOS transistor Q1 in each hard disk status indication module is connected to the enable control output end of the controller through the current-limiting resistor R8 in a one-to-one correspondence manner.

In some embodiments, a time-multiplexing control end of each hard disk status indication module is connected to a time-multiplexing control output end of the controller.

A second aspect of the present disclosure provides a hard disk status testing method, which is implemented based on the first aspect of the present disclosure, and includes:

by a voltage reading module, selecting a corresponding hard disk slot unit through an analogue switch, acquiring a voltage output value and a duration cycle in a hard disk status testing module in the corresponding hard disk slot unit, and determining, according to the voltage output value and the duration cycle, a presence status, an activity status and a hard disk type of a hard disk in a hard disk slot; and by a controller, selecting a hard disk status indication module in the corresponding hard disk slot unit through a time-multiplexing control output end, polling a condition of a status indication lamp in the hard disk status indication module in the corresponding hard disk slot unit, and determining a working condition of the hard disk in the corresponding hard disk slot unit.

In some embodiments, the step of determining, according to the voltage output value and the duration cycle, the presence status, the activity status and the hard disk type of the hard disk in the hard disk slot includes:

in response to the voltage output value being the power supply VCC, indicating that the hard disk in the hard disk slot is absent;

in response to the voltage output value being a first voltage value, and the duration cycle being greater than a first time cycle, indicating that the hard disk is present, the hard disk type is SATA/SAS, and the hard disk is not powered up;

in response to the voltage output value cyclically changing between the first voltage value and a second voltage value, and the duration cycle being the first time cycle, indicating that the hard disk is present, the hard disk type is SATA/SAS, and the hard disk is normally read and written;

in response to the voltage output value being the second voltage value, and the duration cycle being greater than the first time cycle, indicating that the hard disk is present, the hard disk type is SATA/SAS, and the hard disk has been powered up, but has not been read and written;

in response to the voltage output value being a third voltage value, and the duration cycle being greater than the first time cycle, indicating that the hard disk is present, the hard disk type is NVMe, and the hard disk is not powered up;

in response to the voltage output value cyclically changing between the third voltage value and a fourth voltage value, and the duration cycle being the first time cycle, indicating that the hard disk is present, the hard disk type is NVMe, and the hard disk is normally read and written; and in response to the voltage output value being the fourth voltage value, and the duration cycle being greater than the first time cycle, indicating that the hard disk is present, the hard disk type is NVMe, and the hard disk has been powered up, but has not been read and written.

The technical solution adopted in the present disclosure includes the following technical effects:

1. The present disclosure effectively solves the problem of an increase in the number of pins needed for hard disk status testing and status indication, thus effectively decreasing hardware costs and increasing the utilization rate of pin resources.

2. In the technical solution of the present disclosure, a plurality of signals to be tested in hard disks of a backplane are combined into one signal. When the number of pins is reduced, signals to be tested of all hard disks can be combined into one signal to be tested, whereby the pin resources of the controller are saved; and PCB routing is simplified, which is particularly suitable for a backplane with multiple hard disks.

3. In the technical solution of the present disclosure, the number (3N in the traditional solution) of indicator lamp control pins is optimized to 4+N, which further saves the pin resources of a main control module.

It should be understood that the above general descriptions and the following detailed descriptions are exemplary and explanatory only, and are not intended to limit the present disclosure.

BRIEF DESCRIPTION OF THE DRAWINGS

In order to describe the embodiments of the present disclosure or the technical solutions in the prior art more clearly, drawings required to be used in the embodiments or the illustration of the prior art will be briefly introduced below. Obviously, those ordinarily skilled in the art also can acquire other drawings according to these drawings without creative work.

DETAILED DESCRIPTION

In order to clearly describe the technical features of this solution, the present disclosure will be described in detail below by specific implementations and accompanying drawings thereof. The following disclosure provides many different embodiments or examples for implementing different structures of the present disclosure. In order to simplify the disclosure of the present disclosure, components and settings of specific examples are described below. In addition, the present disclosure may repeatedly refer to numbers and/or letters in different examples. This repetition is for the purpose of simplification and clarity, and does not in itself indicate the relationship between the various embodiments and/or settings discussed. It should be noted that the components illustrated in the drawings are not necessarily drawn to scale. The present disclosure omits the description of well-known components and processing technologies to avoid unnecessary limitation to the present disclosure.

As shown in FIG. 1 to FIG. 4, the present disclosure provides a hard disk status testing apparatus, including a voltage reading module 1, a controller 2, an analogue switch 3, and multiple hard disk slot units 4. Each hard disk slot unit 4 includes: a hard disk status testing module 41 and a hard disk status indication module 42. A testing output end of each hard disk status testing module 41 is connected to an input end of the analogue switch 3. An output end of the analogue switch 3 is connected to an input end of the voltage reading module 1. A control input end of each hard disk status indication module 42 is connected to a control output end of the controller 2. The hard disk status testing modules 41 and the hard disk status indication modules 42 among different hard disk slot units 4 are time-multiplexed, achieving independent control of the hard disk status testing modules 41 among different hard disk slot units 4 and independent control of the hard disk status indication modules 42 among different hard disk slot units 4.

Figure 2:
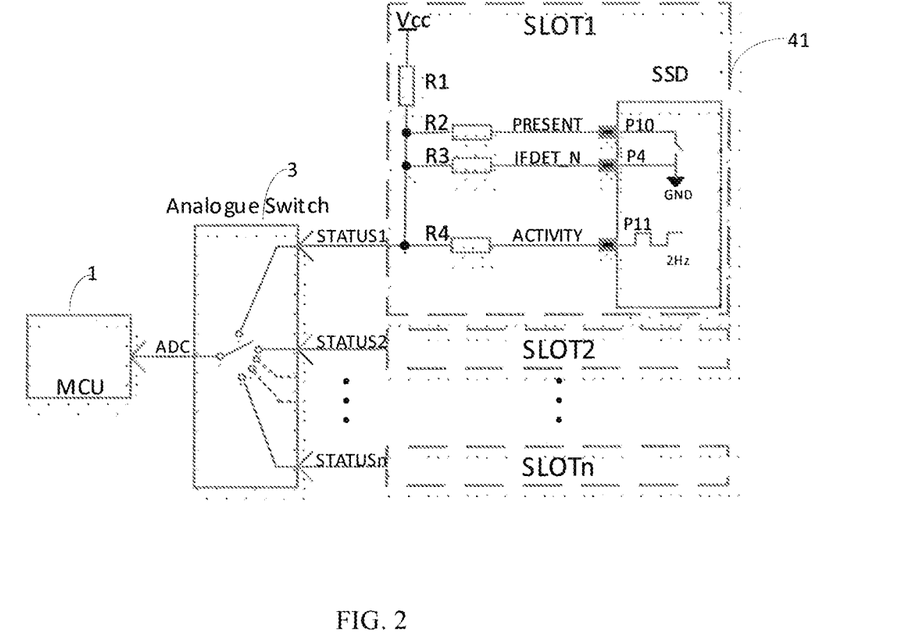
FIG. 2 is a schematic diagram of connection of a hard disk status testing module in the embodiment in the solution of the present disclosure.

In some embodiments, the hard disk status testing module 41 includes: a first presence testing terminal (PRESENT_N/P10), a second presence testing terminal (IFDET_N/P4), an activity status testing terminal (ACTIVITY/P11), a pull-up resistor R1, a first testing resistor R2, a second testing resistor R3, and a third testing resistor R4. The first presence testing terminal is connected to one end of the first testing resistor R2; one path of the other end of the first testing resistor R2 is connected to a power supply VCC through the pull-up resistor R1, and the other path is connected to a first input end of the analogue switch 3. The second presence testing terminal is connected to one end of the second testing resistor R3. One path of the other end of the second testing resistor R3 is connected to the power supply VCC through the pull-up resistor R1, and the other path is connected to the first input end of the analogue switch 3. The activity status testing terminal is connected to one end of the third testing resistor R4. One path of the other end of the third testing resistor R4 is connected to the power supply VCC through the pull-up resistor R1, and the other path is connected to the first input end of the analogue switch 3.

In some embodiments, the resistance values of the pull-up resistor R1, the first testing resistor R2, the second testing resistor R3 and the third testing resistor R4 are different from each other.

Figure 1:
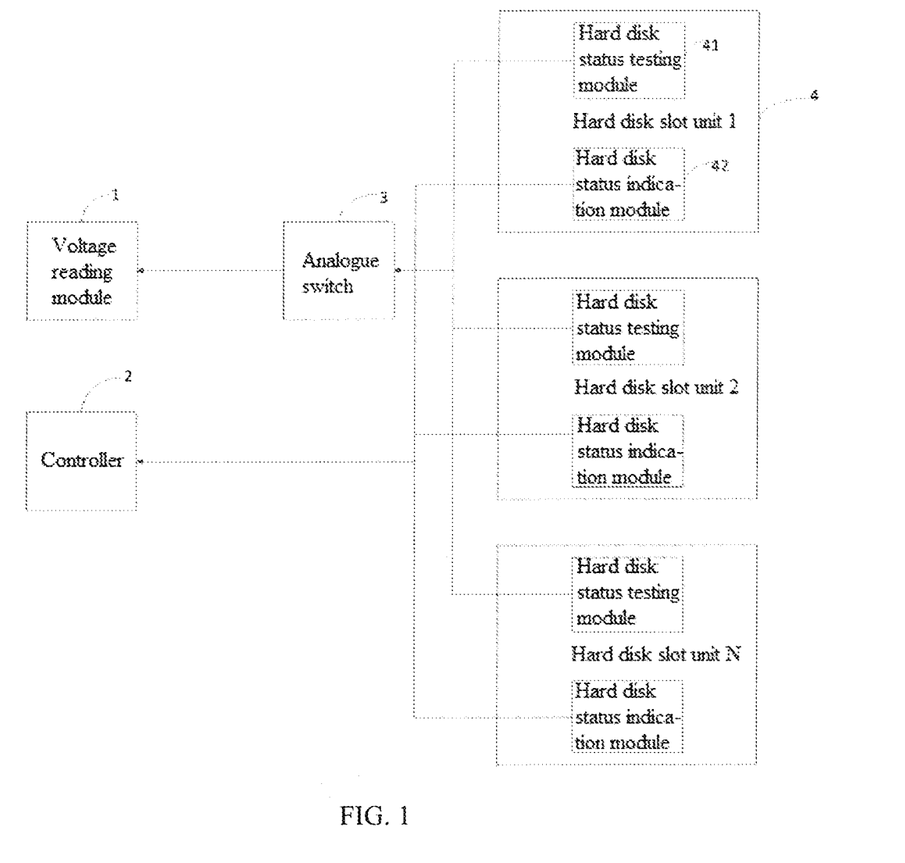
FIG. 1 is a schematic structural diagram of an apparatus of an embodiment in the solution of the present disclosure.

The hard disk status testing modules 41 among different hard disk slot units 4 are selected by the analogue switch 3 to achieve time multiplexing.

The voltage reading module 1 is a control chip with an ADC function.

PRESENT_N, IFDET_N and ACTIVITY pins of a U.2 connector (SFF-8639) are respectively connected in series with the first testing resistor R2, the second testing resistor R3 and the third testing resistor R4 on a backplane and then are connected together, thus obtaining a STATUS signal (a voltage signal of the hard disk status testing module read by the voltage reading module). The STATUS signal is pulled up to the power supply VCC by the pull-up resistor R1.

N STATUS signals are respectively obtained using the same resistor connection mode by N hard disk slots SLOT, and are named STATUS1, STATUS2, ..., STATUSn. Each STATUS signal can be connected to an input end of the analogue switch 3. An output end of the analog switch 3 is connected to an ADC of the control chip. The ADC adopts a time-multiplexing mode for sampling STATUS voltages at different slots, and STATUS voltage values of different hard disk slots are regularly polled and tested by means of switching different channels of the analogue switch 3. Preferably, if there are a plenty of ADC resources, each STATUS signal can be connected to an independent ADC, without selection by the analogue switch. However, an additional controller needs to control the timing sequence of time-multiplexing of the control chip with the ADC function.

According to the U.2 hard disk standard, internal connection statuses of the PRESENT_N and IFDET_N signals of the SATA/SAS disk and NVMe disk are different. For the SATA/SAS disk, PRESNET=L (low level) and IFDET_N=L. For the NVMe disk, PRESNET=OD (high level) and IFDET_N=L. If there is no hard disk, PRESNET=OD and IFDET_N=OD. The ACTIVITY signal has different level signals when the hard disk is normally powered down, is powered up but does not work normally, and is normally read and written. The ACTIVITY signal is at OD when the hard disk is powered down, is at L when the hard disk is powered up but does not work, and outputs 2 Hz square waves when the hard disk is normally read and written.

When the SATA/SAS disk and the NVMe disk are present and active, the parallel connected resistors have corresponding resistance values (R2//R3//R4). Changes in the resistance values have correspondence relationships with the types, presences and running statuses of the hard disks.

Figure 3:
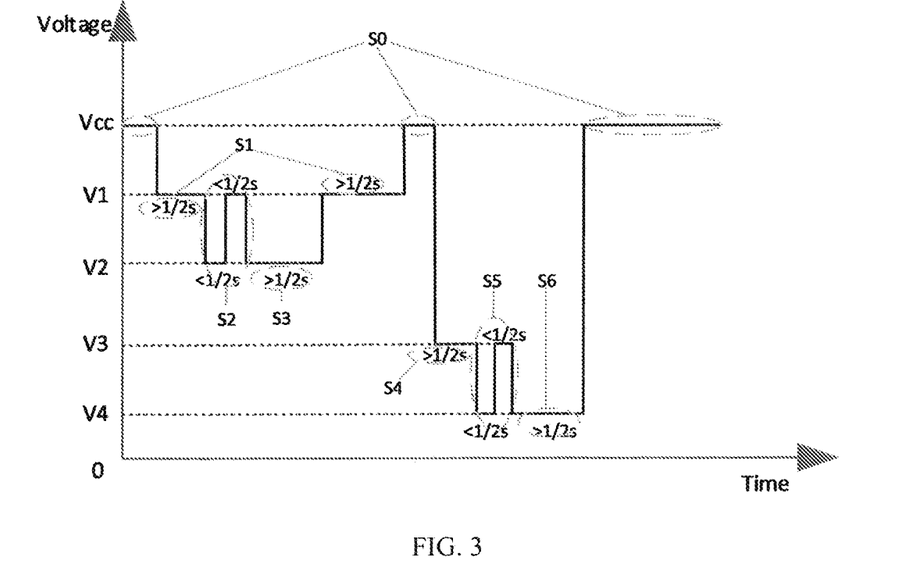
FIG. 3 is a schematic diagram of a duration cycle of a hard disk status testing module in the embodiment in the solution of the present disclosure.

| SSD Type | PRESENT | IFDET_N | ACTIVITY | R2//R3//R4 | Discription | Status Voltage |
|---|---|---|---|---|---|---|
| SATA/SAS | L | L | OD | R2//R3 | power down | V1 (>1/2s) |
| | | | L | R2//R3//R4 | power up, not Active | V2 (>1/2s) |
| | | | 2 Hz | R2//R3 | High Level of 2 Hz | V1 (<1/2s) |
| | | | | R2//R3//R4 | Low Level of 2 Hz | V2 (<1/2s) |
| NVMe | OD | L | OD | R3 | power down | V3 (>1/2s) |
| | | | L | R3//R4 | power up, not Active | V4 (>1/2s) |
| | | | 2 Hz | R3 | High Level of 2 Hz | V3 (<1/2s) |
| | | | | R3//R4 | Low Level if 2 Hz | V4 (<1/2s) |
| NC (Absent) | OD | OD | OD | | SSD not Present | Vcc |

The voltage reading module 1 selects the corresponding hard disk slot unit 4 through the analogue switch 3, acquires a voltage output value and a duration cycle in the hard disk status testing module 41 in the corresponding hard disk slot unit 4, and determines, according to the voltage output value and the duration cycle, a presence status, an activity status and a hard disk type of a hard disk in a hard disk slot. If the voltage output value is the power supply VCC, the hard disk in the hard disk slot is absent (corresponding to S0 in FIG. 3). If the voltage output value is a first voltage value V1, and the duration cycle is greater than a first time cycle (½ s), the hard disk is present, the hard disk type is SATA/SAS, and the hard disk is not powered up (corresponding to S1 in FIG. 3). If the voltage output value cyclically changes between the first voltage value V1 and a second voltage value V2, and the duration cycle is the first time cycle, the hard disk is present, the hard disk type is SATA/SAS, and the hard disk is normally read and written (corresponding to S2 in FIG. 3). If the voltage output value is the second voltage value V2, and the duration cycle is greater than the first time cycle, the hard disk is present, the hard disk type is SATA/SAS, and the hard disk has been powered up, but has not been read and written (corresponding to S3 in FIG. 3). If the voltage output value is a third voltage value V3, and the duration cycle is greater than the first time cycle, the hard disk is present, the hard disk type is NVMe, and the hard disk is not powered up (corresponding to S4 in FIG. 3). If the voltage output value cyclically changes between the third voltage value V3 and a fourth voltage value V4, and the duration cycle is the first time cycle, the hard disk is present, the hard disk type is NVMe, and the hard disk is normally read and written (corresponding to S5 in FIG. 3). If the voltage output value is the fourth voltage value V4, and the duration cycle is greater than the first time cycle, the hard disk is present, the hard disk type is NVMe, and the hard disk has been powered up, but has not been read and written (corresponding to S6 in FIG. 3).

The first voltage value is $$V1 = \frac{R_2//R_3}{R_1 + R_2//R_3} VCC,$$

where $R_2//R_3$ represents a resistance value after the first testing resistor $R_2$ is connected in parallel with the second testing resistor $R_3$. The second voltage value is $$V2 = \frac{R_2//R_3//R_4}{R_1 + R_2//R_3//R_4} VCC.$$

The third voltage value is $$V3 = \frac{R_3}{R_1 + R_3} VCC.$$

The fourth voltage value is $$V4 = \frac{R_3//R_4}{R_1 + R_3//R_4} VCC.$$

The presence status, the activity status and the hard disk type of the hard disk in the hard disk slot are determined according to the voltage output value and the duration cycle.

Figure 4:
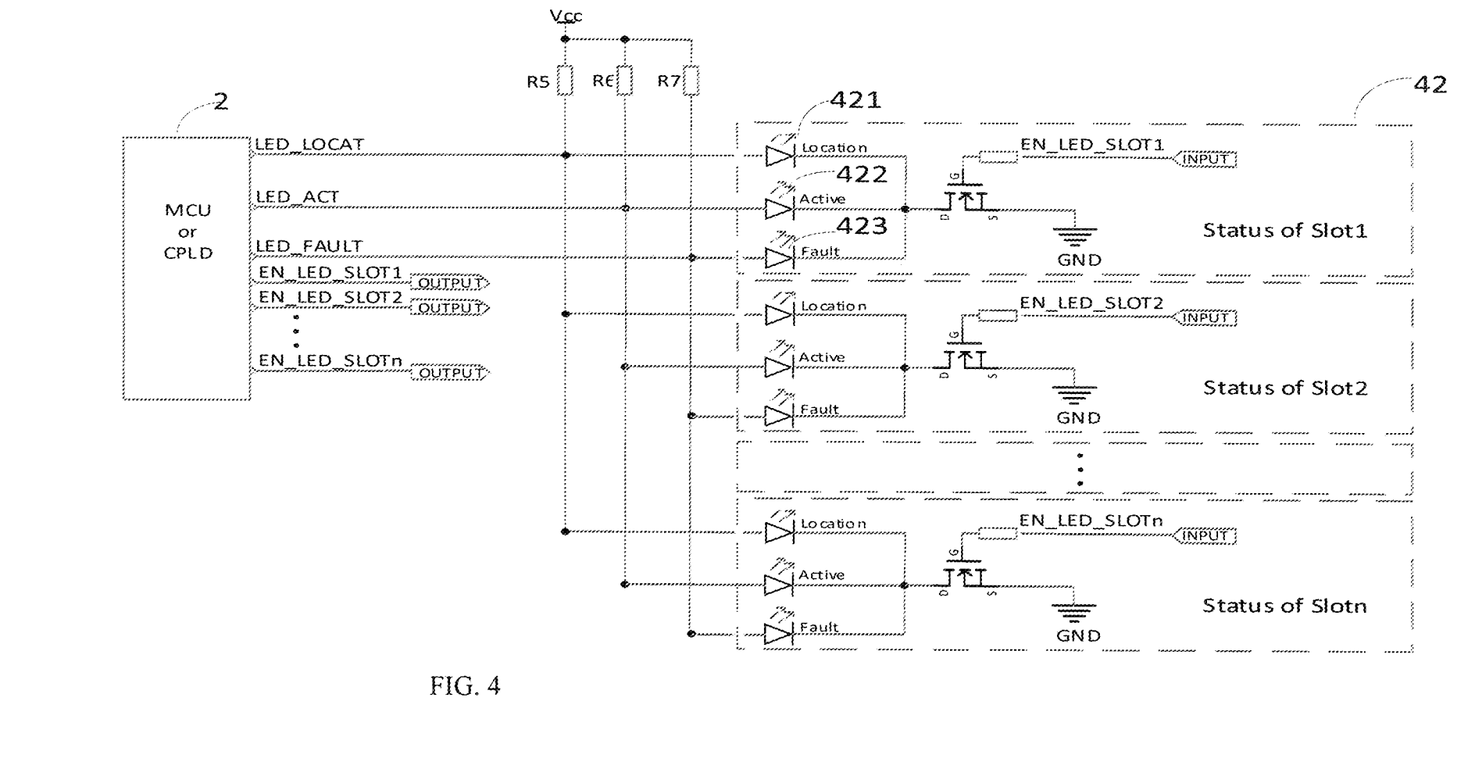
FIG. 4 is a schematic diagram of connection of a hard disk status indication module in the embodiment in the solution of the present disclosure.

The hard disk status indication module 42 includes: a first status indicator lamp 421, a second status indicator lamp 422, a third status indicator lamp 423, an MOS transistor Q1, and a current-limiting resistor R8. One path of a positive pole of the first status indicator lamp 421 is connected to the power supply VCC through a pull-up resistor R5, and the other path is connected to the control output end of the controller 2. A negative pole of the first status indicator lamp 421 is connected to a drain of the MOS transistor Q1. A gate of the MOS transistor Q1 is connected to a first enable control output end of the controller 2 through the current-limiting resistor R8. A source of the MOS transistor Q1 is grounded. One path of a positive pole of the second status indicator lamp 422 is connected to the power supply VCC through a pull-up resistor R6, and the other path is connected to the control output end of the controller 2. A negative pole of the second status indicator lamp 422 is connected to the drain of the MOS transistor Q1. The gate of the MOS transistor Q1 is connected to the first enable control output end of the controller 2 through the current-limiting resistor R8. The source of the MOS transistor Q1 is grounded. One path of a positive pole of the third status indicator lamp 423 is connected to the power supply VCC through a pull-up resistor R7, and the other path is connected to the control output end of the controller 2. A negative pole of the third status indicator lamp 423 is connected to the drain of the MOS transistor Q1. The gate of the MOS transistor Q1 is connected to the first enable control output end of the controller 2 through the current-limiting resistor R8. The source of the MOS transistor Q1 is grounded. The first status indicator lamp 421 can be a Location indicator lamp. The second status indicator lamp 422 can be an Active indicator lamp. The third status indicator lamp 423 can be a Fault indicator lamp. They can also be flexibly adjusted according to an actual condition. The present disclosure does not make restrictions on this.

The controller 2 may be a microcontroller unit (MCU) or a Complex Programmable Logic Device (CPLD). Considering the cost of the device, the voltage reading module 1 can be used. Three independent General Purpose Input/Outputs (GPIOs) of the controller 2 are used as LED control signals (LED_LOCAT, LED_ACT, and LED_FAULT). The above LED control signals are respectively connected to the power supply VCC through the pull-up resistors R5, R6 and R7. The resistance values are selected according to the volt-ampere characteristics of each status indicator lamp LED.

The gate of the MOS transistor Q1 in each hard disk status indication module 42 is connected to the enable control output end of the controller 2 through the current-limiting resistor R8 in a one-to-one correspondence manner.

N slots share the same status indicator lamp LED control signal, that is, each slot LED_LOCAT share one GPIO; LED_ACT share one GPIO; and LED_FAULT share one GPIO. Lighting slot enable signals of the N slots are independent of each other, that is, EN_LED_SLOT1, EN_LED_SLOT2, . . . , and EN_LED_SLOTn use independent GPIOs.

A time-multiplexing control end of each hard disk status indication module 42 is connected to a time-multiplexing control output end of the controller 2. The time-multiplexing control output end of the controller 2 is time-multiplexed by the N slots. Since the hard disk slot enable signals corresponding to the hard disk status indication modules are cyclically switched, the three lamps of only one slot are lightened at any time. A polling cycle is less than the visual retention time of human eyes. Matrix lamp lighting achieves control of the indicator lamps of the hard disks of the backplane.

Hard disk presence and status testing signals are signals with low instantaneity requirements. Time-sharing testing is used between signals to be tested of different hard disks to multiplex ADC resources. According to the visual retention effect of human eyes on images, the lighting mode is changed from a normally-on lighting mode to a cyclic polling lighting. Different slots share lighting control signals.

It should be noted that the present disclosure takes the U.2 connector in the backplane as an example, but is not limited to a U.2 hard disk backplane. It is also applicable to an HDD hard disk backplane, or other hard disk backplanes that need to be tested and lit.

The present disclosure effectively solves the problem of an increase in the number of pins needed for hard disk status testing and status indication, thus effectively decreasing hardware costs and increasing the utilization rate of pin resources.

In the technical solution of the present disclosure, a plurality of signals to be tested in hard disks of a backplane are combined into one signal. When the number of pins is reduced, signals to be tested of all hard disks can be combined into one signal to be tested, whereby the pin resources of the controller are saved; and PCB routing is simplified, which is particularly suitable for a backplane with multiple hard disks.

In the technical solution of the present disclosure, the number (3N in the traditional solution) of indicator lamp control pins is optimized to 4+N, which further saves the pin resources of a main control module.

Figure 5:
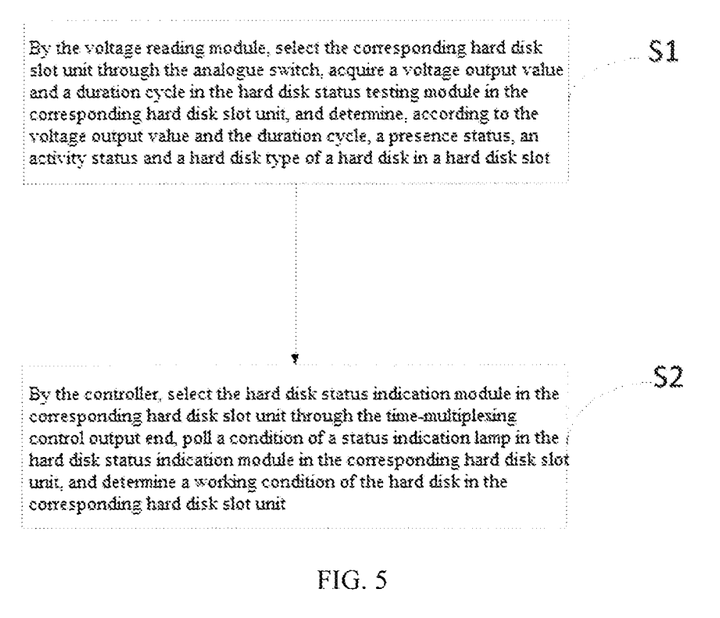
FIG. 5 is a flow chart of a method of another embodiment in the solution of the present disclosure.

As shown in FIG. 5, the technical solution of the present disclosure further provides a hard disk status testing method, which is implemented based on the aforementioned embodiment of the present disclosure, and includes:

S1, the voltage reading module selects the corresponding hard disk slot unit through the analogue switch, acquires a voltage output value and a duration cycle in the hard disk status testing module in the corresponding hard disk slot unit, and determines, according to the voltage output value and the duration cycle, a presence status, an activity status and a hard disk type of a hard disk in a hard disk slot; and S2, the controller selects the hard disk status indication module in the corresponding hard disk slot unit through the time-multiplexing control output end, polls a condition of a status indication lamp in the hard disk status indication module in the corresponding hard disk slot unit, and determines a working condition of the hard disk in the corresponding hard disk slot unit.

Figure 6:
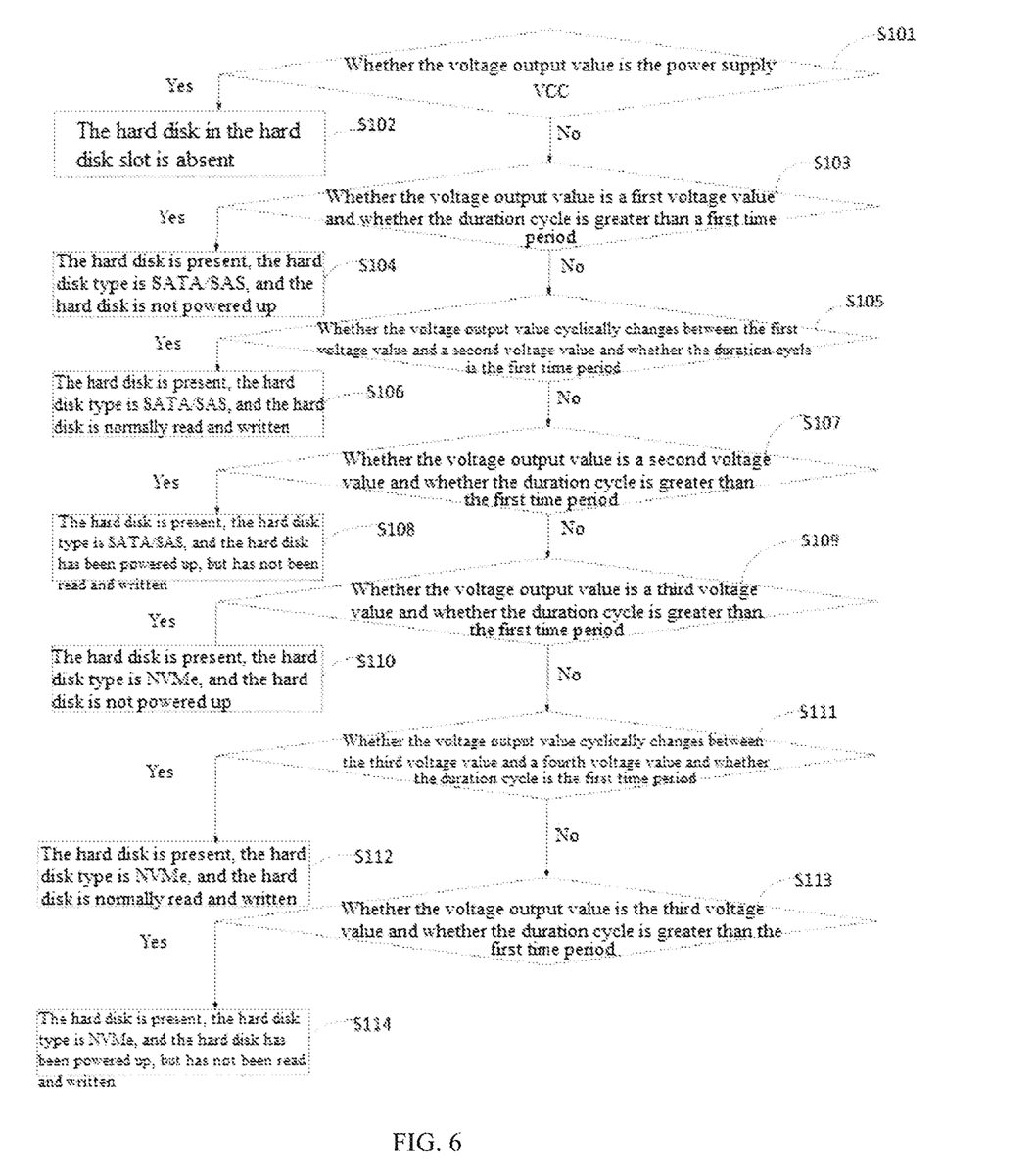
FIG. 6 is a flow chart of step S1 in a method of a further embodiment in the solution of the present disclosure.

As shown in FIG. 6, in step S1, the step that a presence status, an activity status and a hard disk type of a hard disk in a hard disk slot are determined according to the voltage output value and the duration cycle includes:

S101, whether the voltage output value is the power supply VCC is determined; if a determining result is positive, step S102 is executed; and if the determining result is negative, step S103 is executed.

S102, the hard disk in the hard disk slot is absent.

S103, whether the voltage output value is a first voltage value and whether the duration cycle is greater than a first time period are determined; if a determining result is positive, step S104 is executed; and if the determining result is negative, step S105 is executed.

S104, the hard disk is present, the hard disk type is SATA/SAS, and the hard disk is not powered up.

S105, whether the voltage output value cyclically changes between the first voltage value and a second voltage value and whether the duration cycle is the first time period are determined; if a determining result is positive, step S106 is executed; and if the determining result is negative, step S107 is executed.

S106, the hard disk is present, the hard disk type is SATA/SAS, and the hard disk is normally read and written.

S107, whether the voltage output value is a second voltage value and whether the duration cycle is greater than the first time period are determined; if a determining result is positive, step S108 is executed; and if the determining result is negative, step S109 is executed.

S108, the hard disk is present, the hard disk type is SATA/SAS, and the hard disk has been powered up, but has not been read and written.

S109, whether the voltage output value is a third voltage value and whether the duration cycle is greater than the first time period are determined; if a determining result is positive, step S110 is executed; and if the determining result is negative, step S111 is executed.

S110, the hard disk is present, the hard disk type is NVMe, and the hard disk is not powered up.

S111, whether the voltage output value cyclically changes between the third voltage value and a fourth voltage value and whether the duration cycle is the first time period are determined; if a determining result is positive, step S112 is executed; and if the determining result is negative, step S113 is executed.

S112, the hard disk is present, the hard disk type is NVMe, and the hard disk is normally read and written.

S113, whether the voltage output value is the third voltage value and whether the duration cycle is greater than the first time period are determined; and if a determining result is positive, step S114 is executed.

S114, the hard disk is present, the hard disk type is NVMe, and the hard disk has been powered up, but has not been read and written.

The present disclosure effectively solves the problem of an increase in the number of pins needed for hard disk status testing and status indication, thus effectively decreasing hardware costs and increasing the utilization rate of pin resources.

In the technical solution of the present disclosure, a plurality of signals to be tested in hard disks of a backplane are combined into one signal. When the number of pins is reduced, signals to be tested of all hard disks can be combined into one signal to be tested, whereby the pin resources of the controller are saved; and PCB routing is simplified, which is particularly suitable for a backplane with multiple hard disks.

In the technical solution of the present disclosure, the number (3N in the traditional solution) of indicator lamp control pins is optimized to 4+N, which further saves the pin resources of a main control module.

Although the specific implementations of the present disclosure are described above in combination with the accompanying drawings, they do not limit the protection scope of the present disclosure. Those skilled in the art should understand that on the basis of the technical solutions of the present disclosure, various modifications or transformations that can be made by those skilled in the art without creative work still fall within the protection scope of the present disclosure.

What is claimed is:

1. A hard disk status testing apparatus, comprising a voltage reading module, a controller, an analogue switch, and multiple hard disk slot units, wherein each hard disk slot unit of the multiple hard disk slot units comprises:

a hard disk status testing module and a hard disk status indication module, wherein the hard disk status testing module comprises: a first presence testing terminal, a second presence testing terminal, an activity status testing terminal, a pull-up resistor, a first testing resistor, a second testing resistor, and a third testing resistor; the first presence testing terminal is connected to a first end of the first testing resistor; a first path of a second end of the first testing resistor is connected to a power supply through the pull-up resistor, and a second path of the second end of the first testing resistor is connected to an input end of the analogue switch; the second presence testing terminal is connected to a first end of the second testing resistor; a first path of a second end of the second testing resistor is connected to the power supply through the pull-up resistor, and a second path of the second end of the second testing resistor is connected to the input end of the analogue switch; the activity status testing terminal is connected to a first end of the third testing resistor; a first path of a second end of the third testing resistor is connected to the power supply through the pull-up resistor, and a second path of the second end of the third testing resistor is connected to the input end of the analogue switch; a testing output end of each hard disk status testing module is connected to the input end of the analogue switch; an output end of the analogue switch is connected to an input end of the voltage reading module; a control input end of each hard disk status indication module is connected to a control output end of the controller; and the hard disk status testing modules and the hard disk status indication modules among different hard disk slot units of the multiple hard disk slot units are time-multiplexed, achieving independent control of the hard disk status testing modules among the different hard disk slot units and independent control of the hard disk status indication modules among the different hard disk slot units.

2. The hard disk status testing apparatus according to claim 1, wherein resistance values of the pull-up resistor, the first testing resistor, the second testing resistor and the third testing resistor are different from each other.

3. The hard disk status testing apparatus according to claim 1, wherein the hard disk status testing modules among the different hard disk slot units are selected by the analogue switch to achieve time multiplexing.

4. The hard disk status testing apparatus according to claim 1, wherein the voltage reading module is a control chip with an analog-digital conversion (ADC) function.

5. The hard disk status testing apparatus according to claim 1, wherein the hard disk status indication module comprises: a first status indicator lamp, a second status indicator lamp, a third status indicator lamp, a metal oxide semiconductor (MOS) transistor, and a current-limiting resistor; a first path of a positive pole of the first status indicator lamp is connected to the power supply through the pull-up resistor, and a second path of the positive pole of the first status indicator lamp is connected to the control output end of the controller; a negative pole of the first status indicator lamp is connected to a drain of the MOS transistor; a gate of the MOS transistor is connected to a first enable control output end of the controller through the current-limiting resistor; a source of the MOS transistor is grounded; a first path of a positive pole of the second status indicator lamp is connected to the power supply through a second pull-up resistor, and a second path of the positive pole of the second status indicator lamp is connected to the control output end of the controller; a negative pole of the second status indicator lamp is connected to the drain of the MOS transistor; a first path of a positive pole of the third status indicator lamp is connected to the power supply through a third pull-up resistor, and a second path of the positive pole of the third status indicator lamp is connected to the control output end of the controller; and a negative pole of the third status indicator lamp is connected to the drain of the MOS transistor.

6. The hard disk status testing apparatus according to claim 5, wherein the gate of the MOS transistor in each hard disk status indication module is connected to the first enable control output end of the controller through the current-limiting resistor in a one-to-one correspondence manner.

7. The hard disk status testing apparatus according to claim 5, wherein a time-multiplexing control end of each hard disk status indication module is connected to a time-multiplexing control output end of the controller.

8. A hard disk status testing method, implemented on the hard disk status testing apparatus according to claim 1, comprising:

by the voltage reading module, selecting a corresponding hard disk slot unit of the multiple hard disk slot units through the analogue switch, acquiring a voltage output value and a duration cycle in the hard disk status testing module in the corresponding hard disk slot unit, and determining, according to the voltage output value and the duration cycle, a presence status, an activity status and a hard disk type of a hard disk in a hard disk slot; and by the controller, selecting the hard disk status indication module in the corresponding hard disk slot unit through a time-multiplexing control output end of the controller, polling a condition of a status indication lamp in the hard disk status indication module in the corresponding hard disk slot unit, and determining a working condition of the hard disk in the corresponding hard disk slot unit.

9. The hard disk status testing method according to claim 8, wherein the determining, according to the voltage output value and the duration cycle, the presence status, the activity status and the hard disk type of the hard disk in the hard disk slot comprises:
in response to the voltage output value being the power supply, indicating that the hard disk in the hard disk slot is absent.

10. The hard disk status testing method according to claim 8, wherein the determining, according to the voltage output value and the duration cycle, the presence status, the activity status and the hard disk type of the hard disk in the hard disk slot comprises:
in response to the voltage output value being a first voltage value, and the duration cycle being greater than a first time cycle, indicating that the hard disk is present, the hard disk type is Serial Advanced Technology Attachment/Serial Attached Small Computer System Interface (SATA/SAS), and the hard disk is not powered up.

11. The hard disk status testing method according to claim 8, wherein the determining, according to the voltage output value and the duration cycle, the presence status, the activity status and the hard disk type of the hard disk in the hard disk slot comprises:
in response to the voltage output value cyclically changing between a first voltage value and a second voltage value, and the duration cycle being a first time cycle, indicating that the hard disk is present, the hard disk type is Serial Advanced Technology Attachment/Serial Attached Small Computer System Interface (SATA/SAS), and the hard disk is normally read and written.

12. The hard disk status testing method according to claim 8, wherein the determining, according to the voltage output value and the duration cycle, the presence status, the activity status and the hard disk type of the hard disk in the hard disk slot comprises:
in response to the voltage output value being a second voltage value, and the duration cycle being greater than a first time cycle, indicating that the hard disk is present, the hard disk type is Serial Advanced Technology Attachment/Serial Attached Small Computer System Interface (SATA/SAS), and the hard disk has been powered up, but has not been read and written.

13. The hard disk status testing method according to claim 8, wherein the determining, according to the voltage output value and the duration cycle, the presence status, the activity status and the hard disk type of the hard disk in the hard disk slot comprises:
in response to the voltage output value being a third voltage value, and the duration cycle being greater than a first time cycle, indicating that the hard disk is present, the hard disk type is Nonvolatile Memory Express (NVMe), and the hard disk is not powered up.

14. The hard disk status testing method according to claim 8, wherein the determining, according to the voltage output value and the duration cycle, the presence status, the activity status and the hard disk type of the hard disk in the hard disk slot comprises:
in response to the voltage output value cyclically changing between a third voltage value and a fourth voltage value, and the duration cycle being a first time cycle, indicating that the hard disk is present, the hard disk type is Nonvolatile Memory Express (NVMe), and the hard disk is normally read and written.

15. The hard disk status testing method according to claim 8, wherein the determining, according to the voltage output value and the duration cycle, the presence status, the activity status and the hard disk type of the hard disk in the hard disk slot comprises:
in response to the voltage output value being a fourth voltage value, and the duration cycle being greater than a first time cycle, indicating that the hard disk is present, the hard disk type is Nonvolatile Memory Express (NVMe), and the hard disk has been powered up, but has not been read and written.

16. The hard disk status testing method according to claim 10, wherein the first voltage value is $$V1 = \frac{R_2//R_3}{R_1 + R_2//R_3} VCC,$$

wherein $R_2//R_3$ represents a resistance value after the first testing resistor having a resistance value $R_2$ is connected in parallel with the second testing resistor having a resistance value $R_3$, $R_1$ is a resistance value of the pull-up resistor, and VCC is the power supply.

17. The hard disk status testing method according to claim 11, wherein the second voltage value is $$V2 = \frac{R_2//R_3//R_4}{R_1 + R_2//R_3//R_4} VCC,$$

wherein $R_1$ is a resistance value of the pull-up resistor, $R_2$ is a resistance value of the first testing resistor, $R_3$ is a resistance value of the second testing resistor, $R_4$ is a resistance value of the third testing resistor, and VCC is the power supply.

18. The hard disk status testing method according to claim 13, wherein the third voltage value is $$V3 = \frac{R_3}{R_1 + R_3} VCC,$$

wherein $R_1$ is a resistance value of the pull-up resistor, $R_3$ is a resistance value of the first testing resistor, and VCC is the power supply.

19. The hard disk status testing method according to claim 14, wherein the fourth voltage value is $$V4 = \frac{R_3//R_4}{R_1 + R_3//R_4} VCC,$$

wherein $R_1$ is a resistance value of the pull-up resistor, $R_3$ is a resistance value of the first testing resistor, $R_4$ is a resistance value of the second testing resistor, and VCC is the power supply.

* * * * *